(12) United States Patent
Schlick et al.

(10) Patent No.: US 7,363,194 B2
(45) Date of Patent: Apr. 22, 2008

(54) CONTROL AND EVALUATION SYSTEM FOR A COMPOUND SENSOR

(75) Inventors: Michael Schlick, Pfinztal (DE);
Juergen Hoetzel, Florstadt (DE); Uwe Zimmermann, Ludwigsburg (DE);
Rainer Moritz, Filderstadt (DE);
Bernhard Lucas, Besigheim (DE);
Tore Toennesen, Reutlingen (DE);
Hermann Winner, Bietigheim (DE);
Martin Hueppauff, Stuttgart (DE);
Werner Uhler, Bruchsal (DE);
Joachim Bulla, Hemmingen (DE);
Dirk Schmid, Simmozheim (DE)

(73) Assignee: Robert Bosch GmbH, Stuttgart (DE)

( * ) Notice: Subject to any disclaimer, the term of this patent is extended or adjusted under 35 U.S.C. 154(b) by 399 days.

(21) Appl. No.: 10/275,102

(22) PCT Filed: Feb. 21, 2002

(86) PCT No.: PCT/DE02/00607

§ 371 (c)(1),
(2), (4) Date: May 29, 2003

(87) PCT Pub. No.: WO02/070307

PCT Pub. Date: Sep. 12, 2002

(65) Prior Publication Data

US 2003/0187519 A1  Oct. 2, 2003

(30) Foreign Application Priority Data

Mar. 2, 2001  (DE) .............................. 101 10 042

(51) Int. Cl.
*G06F 11/30*  (2006.01)
*B60R 25/10*  (2006.01)

(52) U.S. Cl. ................... 702/182; 340/426.25

(58) Field of Classification Search ................ 702/182, 702/142, 150, 159, 57, 139, 141; 701/301, 701/36, 45; 340/426.23, 426.25, 471; 700/20; 307/10.1

See application file for complete search history.

(56) References Cited

U.S. PATENT DOCUMENTS

| 5,588,123 | A | * | 12/1996 | Loibl ......................... 710/107 |
| 6,087,928 | A | | 7/2000 | Kleinberg et al. |
| 6,268,803 | B1 | * | 7/2001 | Gunderson et al. ......... 340/903 |
| 6,642,839 | B1 | * | 11/2003 | Gunderson et al. ......... 340/435 |
| 6,748,305 | B1 | * | 6/2004 | Klausner et al. .............. 701/35 |
| 2003/0141965 | A1 | * | 7/2003 | Gunderson et al. ......... 340/431 |
| 2004/0155759 | A1 | * | 8/2004 | Gunderson et al. ......... 340/435 |

FOREIGN PATENT DOCUMENTS

| DE | 43 24 753 | 3/1994 |
| DE | 199 01 847 | 2/2000 |
| EP | 0 518 381 | 12/1992 |
| EP | 0 775 613 | 5/1997 |

* cited by examiner

OTHER PUBLICATIONS

Xing et al., The Application of Controller Area Network on Vehicle, Sep. 6-9, 1999, Vehicle Electronics Conference (IVEC 1999), Proceeding of the IEEE International, vol. 1, pp. 455-458.*

*Primary Examiner*—John Barlow
*Assistant Examiner*—Toan M. Le
(74) *Attorney, Agent, or Firm*—Kenyon & Kenyon LLP

(57) ABSTRACT

A control/evaluation system for a set of sensors, in particular in motor vehicles, has a plurality of areas, each of which has at least one controller and a plurality of sensor devices connected thereto; the controllers may be connected to each other for a common application function.

20 Claims, 5 Drawing Sheets

CONTROL AND EVALUATION SYSTEM FOR A COMPOUND SENSOR

FIELD OF THE INVENTION

The present invention relates to a control/evaluation system for a set of sensors, in particular in motor vehicles.

Although applicable to any arrangement of transport, the present invention and the issues underlying it are explained in reference to a system located on board a motor vehicle.

BACKGROUND INFORMATION

To make traveling with a motor vehicle easier and to prevent collisions with a car or other objects in the way so as to protect the occupants, sensors may be placed on the front and/or rear of the motor vehicle, the sensors emitting signals in order to receive the signals reflected by the obstacle. The distance between the sensor located on the motor vehicle and the obstacle may be determined from the time it takes the signal to travel from the sensor to the obstacle and back again. To register the objects, in particular to measure the distance, a variety of devices may operate on the basis of, for example, radar, lasers or ultrasound. Ultrasound sensors may come into play in particular at close range, because of their high resolution.

A device for registering objects, in particular as a parking assistance device in a motor-vehicle, is described in German Published Patent Application No. 199 01 847. Here all of the distance sensors are connected to a single microcontroller and an output unit.

Where all sensors are connected to a common controller, it may be undesirable that the controller be required to be configured for maximum possible capacity in order to allow future upgrading, even if only some areas of the vehicle are equipped with sensors at the moment. Thus, for customer-oriented equipping of the motor vehicle with sensors only in certain areas, the use of a universal, maximally configured controller may be expensive and technically complicated.

Furthermore, such a system may not be equipped for functional expansion with sophisticated algorithms and functions.

SUMMARY OF THE INVENTION

An object of the present invention may therefore include creating a control/evaluation system for a set of sensors, which may be optimized for the specific user and application with respect to costs and technical complexity.

An exemplary control/evaluation system according to the present invention may provide that in the event that the motor vehicle is initially not completely equipped with sensors, a system appropriately adapted to the particular requirements may be used. This may be both more cost-effective and may involve less installation effort because less cabling may be used. In addition, the exemplary system according to the present invention may be easily upgradable using little technical effort. The flexibility in development may provide for quicker response to market requirements and easier provision of variants.

An idea underlying the present invention may be that the control/evaluation system be divided into multiple areas, each area having at least one controller and a plurality of sensor devices connected thereto, the controllers being combinable with each other for a common application function.

The controlling and evaluation by the sensor system in the surroundings may be distributed over certain sub-areas of the motor vehicle, so that independently-operating systems having an optimized device configuration may be created, which may be interconnected for communication.

According to one exemplary refinement, the controllers for the individual areas may be interconnected through a bus system.

This may ensure simple and cost-effective communication of the individual controllers with each other.

According to an exemplary refinement, the sensor devices for an area may be connected to the corresponding controller through a bus system or a point-to-point connection.

According to another exemplary refinement, the controllers may be all of identical configuration. This may be desirable from both the manufacturing and the economic points of view.

According to another exemplary refinement, at least one sensor device within a particular area may be integrated into the corresponding controller. These two elements may thus be combined into a one-piece sensor/controller device. This sensor/controller device may handle both the generation of its own sensor signal and the control/evaluation function.

According to another exemplary refinement, the sensor/controller devices for the individual areas may be connected to each other though a bus system for a common application function. This may produce in effect a reliable and inexpensive communication system.

According to another exemplary refinement, the sensor devices for an area may be connected to the corresponding sensor/controller device through a bus system or a point-to-point connection.

According to another exemplary refinement, in the particular area the sensor/controller device may be modified only minimally compared to the multiple sensor devices. Hence they may differ only through differences in component configuration, which may contribute to additional cost reduction.

According to another exemplary refinement, the sensor devices are of identical configuration. This too may be desirable in regard to manufacturing technology, and hence may be cost-effective.

According to another exemplary refinement, the sensor devices may be configured as close-range sensors.

According to another exemplary refinement, the system may be divided into at least one of the following areas: a front area, a rear area, a side area and/or a corner area. The side area may be further subdivided into a left and a right side area.

According to another exemplary refinement, an area may have a maximum of six sensor devices. This may be desired for optimized configuration of the individual sub-systems. However, a different number of sensors may be provided.

According to another exemplary refinement, the controllers for the individual areas may be equipped with uniform software, which may include in particular parameterization for assigning the particular controller.

DETAILED DESCRIPTION

In the figures, matching reference symbols designate matching or functionally equivalent components.

Figure 1:
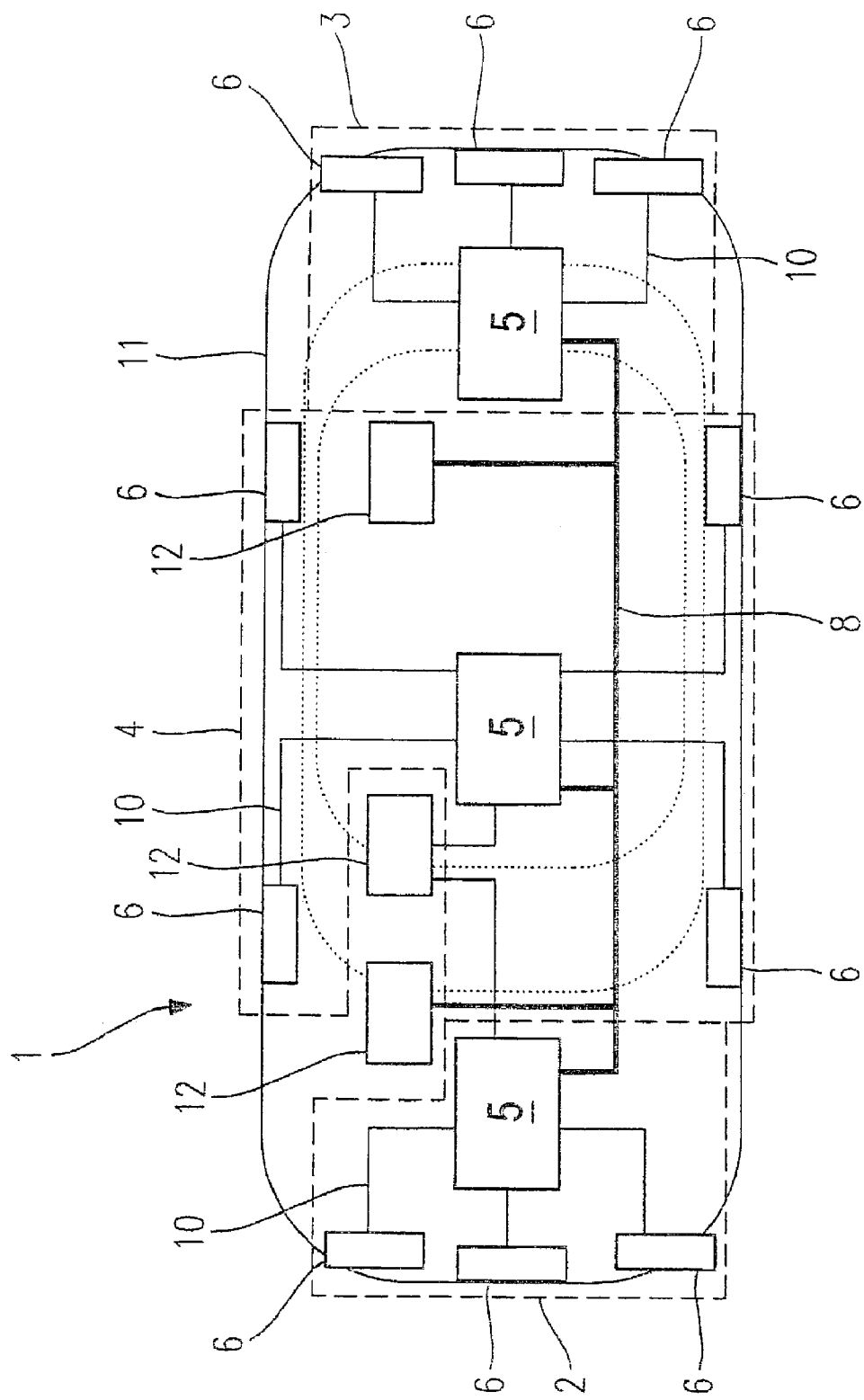
FIG. 1 shows a schematic block diagram of a control/evaluation system in a motor vehicle according to a first exemplary embodiment of the present invention.

FIG. 1 illustrates a schematic block diagram of a control/evaluation system 1 which is mounted in a motor vehicle 11. In accordance with the first exemplary embodiment of the present invention, control/evaluation system 1 is subdivided into three sub-areas 2, 3, 4, sub-area 2 being intended for registering objects in front of the motor vehicle, sub-area 3 for registering objects behind motor vehicle 11, and sub-area 4 for registering objects beside motor vehicle 11.

Sub-area 4 may of course be further subdivided into a right and a left area, or the system may be divided into entirely different sub-areas.

According to the first exemplary embodiment, each area 2, 3, 4 has a controller 5 for controlling and evaluating the sensor signals, and three sensors 6 connected to controller 5 to emit a signal and receive the reflected signal.

According to the first exemplary embodiment, sensors 6 are connected to the assigned controller 5 through a point-to-point connection 10. The individual controllers 5 in turn are connected for comprehensive functions via a network, for example the real-time-capable serial "Controller Area Network" bus system (CAN). System 1 is divided into the individual sub-areas, depending on requirements. For parking assistance, for example, it may be useful to install only areas 2 and 3 in the particular motor vehicle. In the case of a pre-crash or stop-and-go application, for example, it may be only required to install sensors in the front of the motor vehicle, i.e. to configure only sub-area 2. Sensors 6 within a sub-area 2, 3, 4 are controlled and/or evaluated jointly by controller 5. Controllers 5 may also have the function of providing jointly regulated voltage and producing a diagnosis of the momentary status of the motor vehicle.

All controllers 5 of a system 1 may be of identical configuration and may include the same functional possibilities and the same software. They may vary, however, in regard to processor performance and in activating different displays. Optionally, assignment of the particular controller through parameterization may be possible using the software of controllers 5, in the form of end-of-tape programming.

For example, in this manner a controller may be assigned to a particular area 2, 3, 4 or to a particular sensor device 6, and thus may eliminate certain non-required program steps.

The individual controllers 5 that are connected to each other through bus system 8 thus form a total control/evaluation system 1, which may analyze the overall status of motor vehicle 11 with respect to its environment on the basis of individual sub-areas 2, 3, 4 and may initiate suitable measures as appropriate in interaction with additional controllers or display devices. These may include, for example, an acoustic or optical warning signal in a parking assistance device when the distance falls below a certain safety value, deployment of an airbag in a pre-crash function, etc. This higher-level functionality may result from the interaction of individual controllers 5 through common bus system 8. Information from multiple sub-areas may be consolidated by control devices 12 of the particular applications.

Figure 2:
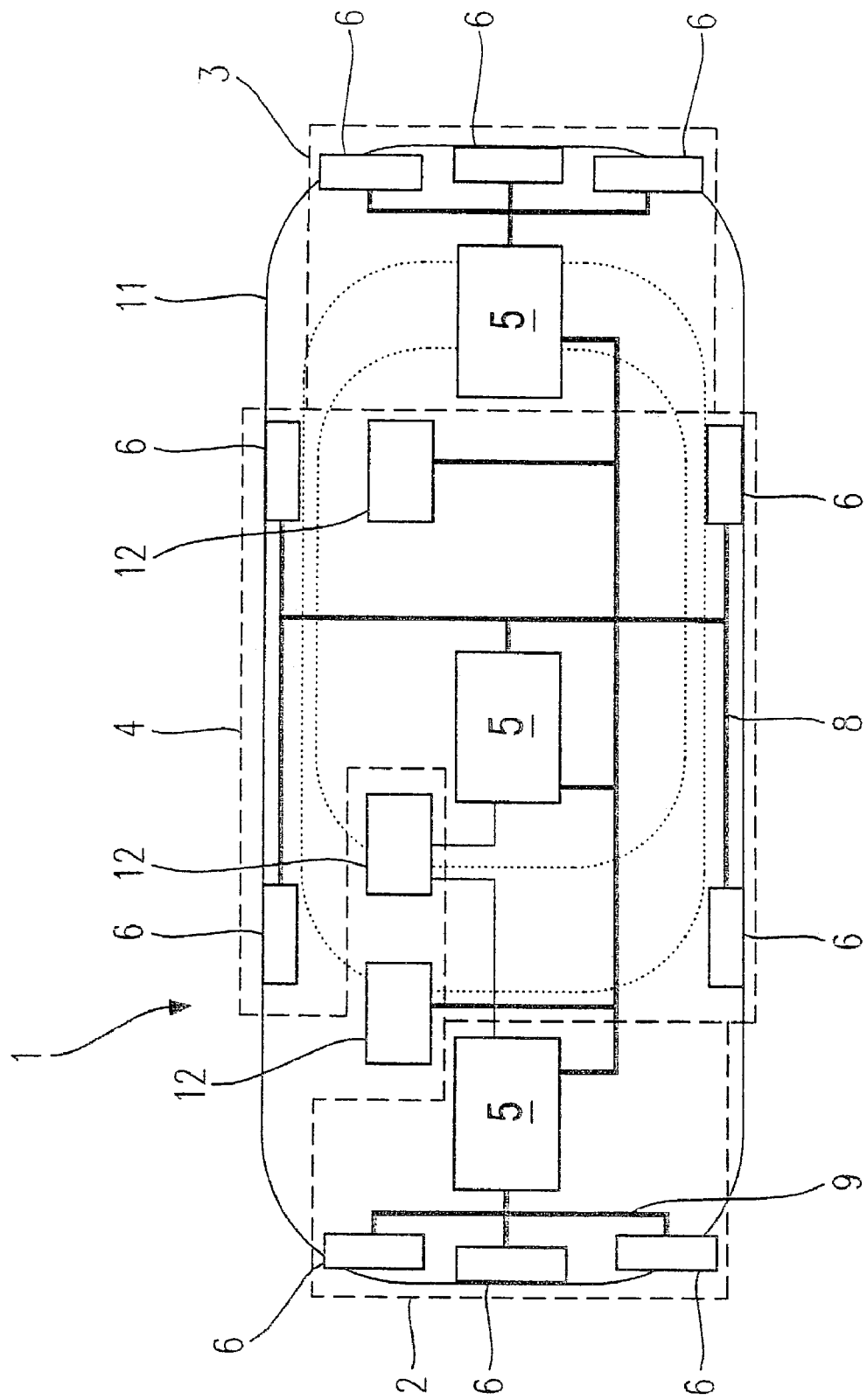
FIG. 2 shows a schematic block diagram of a control/evaluation system in a motor vehicle according to a second exemplary embodiment of the present invention.

FIG. 2 shows a schematic block diagram of a control/evaluation system 1 according to a second exemplary embodiment of the present invention. In contrast to the first exemplary embodiment, individual sensors 6 of a sub-area 2, 3, 4 are also connected to corresponding controller 5 through a bus connection 9.

An overall bus system may also be provided, which may ensure a connection both between the sensors of an area and between the controllers or to control devices of other functions, such as a pre-crash function.

The other components and particular functions correspond to those of the first exemplary embodiment, and therefore require no further explanation. The same is true of example embodiments 3 through 5, explained in greater detail below.

Figure 3:
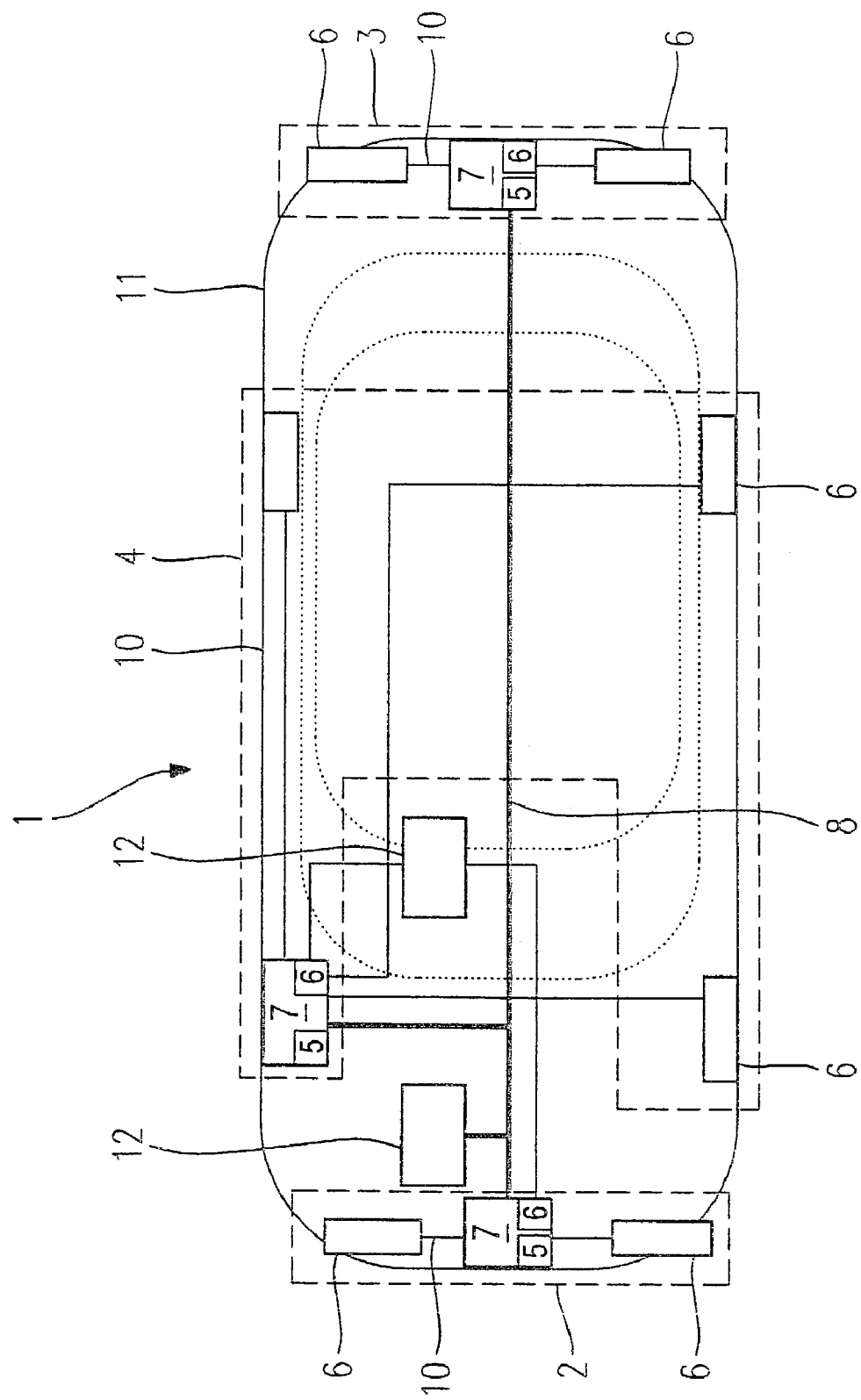
FIG. 3 shows a schematic block diagram of a control/evaluation system in a motor vehicle according to a third exemplary embodiment of the present invention.

FIG. 3 shows a schematic block diagram of a control/evaluation system according to a third exemplary embodiment of the present invention, where controller 5 and a sensor 6 are combined in each area 2, 3, 4 so that in addition to providing its own sensor signal the unit also takes over the controller function for the sub-areas, resulting in a sensor/controller device 7 as a one-piece component. This may result in the saving of one component, producing a more cost-effective, more compact, and space-saving system.

The other sensors 6 in the corresponding sub-areas 2, 3, 4 according to the third exemplary embodiment are connected to sensor/controller device 7 through a point-to-point connection 10. The particular sensor/controller devices 7 are connected with each other for higher-level functions through a bus system 8. This may be analogous in principle to the exemplary embodiments illustrated earlier.

It may also be provided that the functions of a controller be distributed not to one sensor 6 but to a plurality of sensors 6; i.e. certain supply functions and bus concepts are also shifted to the other sensors. It may be desirable however for the main computing load to be accommodated in one sensor.

The particular sensor/controller devices 7 may be of identical configuration for reasons of manufacturing technology, and may be modified only minimally compared to sensor devices 6. This modification may be limited for example to a higher processor capacity and different connections. The remaining sensor devices 6 in turn may be configured identically to each other.

Figure 4:
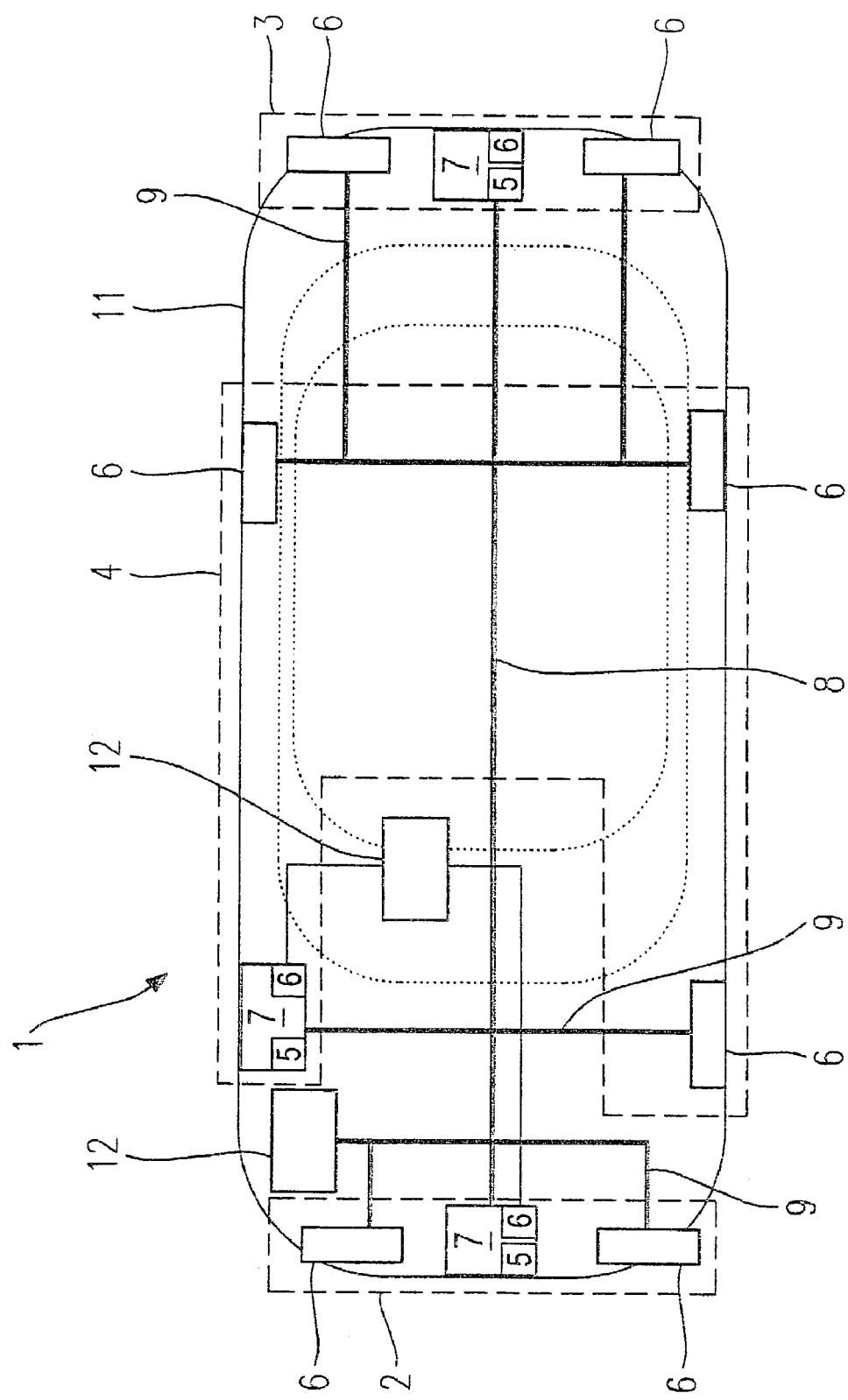
FIG. 4 shows a schematic block diagram of a control/evaluation system in a motor vehicle according to a fourth exemplary embodiment of the present invention.

FIG. 4 shows a schematic block diagram of a control/evaluation system 1 according to a fourth exemplary embodiment of the present invention. In contrast to the third exemplary embodiment, sensor devices 6 of an area 2, 3, 4 are connected to the corresponding sensor/controller device 7 through an appropriate bus system 9. This may produces a simple system which is adaptable to the particular requirements. Controller devices 12 for particular functions, such as deployment of an airbag, display of certain information, etc., are connected to relevant sensor/controller devices 7 through a network system.

Figure 5:
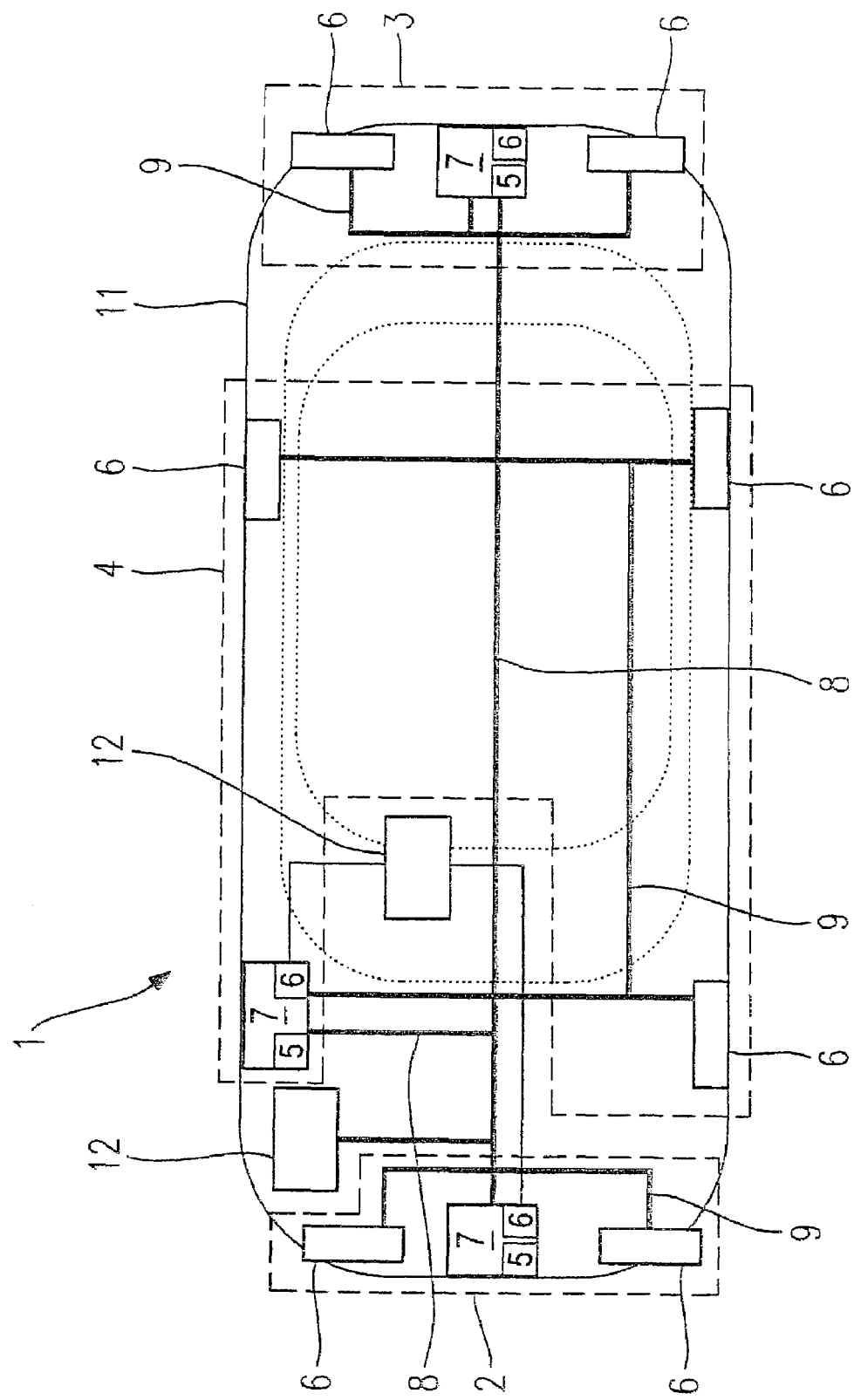
FIG. 5 shows a schematic block diagram of a control/evaluation system in a motor vehicle according to a fifth exemplary embodiment of the present invention.

FIG. 5 shows a schematic block diagram of a control/evaluation system 1 according to a fifth exemplary embodiment of the present invention, wherein sensors 6 are connected within an area 2, 3, 4 to the appropriately assigned sensor/controller device 7 in each case via a private sensor network system. Communication between the individual sensor/controller devices 7 is established via a data network system 8 which is arranged at a higher level. In that manner, comprehensive functions may be implemented.

Thus controlling actions and evaluations which apply to the individual areas 2, 3, 4 may be performed by the appropriately assigned sensor/controller device 7, the communication with sensors 6 being conducted over private sensor network system 9. On the other hand, higher-level functions which are to be performed based on the evaluations of the individual areas 2, 3, 4 as a whole, are performed via the higher-level data network system 8.

The present invention may create a system in which, depending on the desired functionality, only the required areas need to be installed in the corresponding motor vehicle. That may result in cost scalability; i.e., incomplete equipment only slightly more than is actually required is installed, with clear cabling. Even so, an expansion or complete equipment may be realized later if needed.

In addition, defects which arise may be delimited better, and only appropriate areas removed briefly from the overall operation. More advanced independent development of the individual applications than in the case of only one central system may also be possible.

Although the present invention was described above on the basis of an exemplary embodiment, it is not limited thereto but may be modified.

In particular, the division of the individual areas may be selected arbitrarily and depending on the application. For example, placing sensors in corner areas may also be provided. Furthermore, any number of sensors may of course be utilized in a particular area.

What is claimed is:

1. A control and evaluation system for a set of sensor devices, comprising:
   at least one controller and sensor devices connected to the at least one controller in each of a plurality of areas, the at least one controller of each of the plurality of areas being connected to one another, the at least one controller being for controlling and evaluating sensor signals of the sensor devices; and
   at least another controller device connected to the at least one controller for performing at least one of a pre-crash function, a parking assistance function and an airbag function.

2. The system of claim 1, wherein the set of sensors is in a motor vehicle.

3. The system of claim 1, further comprising:
   a bus system for connecting the at least one controller in each of the plurality of areas to each other.

4. The system according to claim 3, wherein the bus system includes a controller area network bus system.

5. The system of claim 1, further comprising:
   one of a bus system and a point-to-point connector arrangement to couple the sensor devices of one of the plurality of areas to a corresponding one of the at least one controller of the one of the plurality of areas.

6. The system of claim 1, wherein the at least one controller of each of the plurality of areas has an identical configuration.

7. The system of claim 1, wherein at least one sensor device is integrated with a corresponding one of the at least one controller to form a sensor and controller device.

8. The system of claim 7, further comprising:
   a bus system for coupling the sensor and controller device to the other sensor and controller devices for the common application function.

9. The system of claim 7, further comprising:
   one of a bus system and a point-to-point connector arrangement to couple the sensor devices of an area of the plurality of areas to a corresponding sensor and controller device.

10. The system of claim 7, wherein the sensor and controller device in a particular area of the plurality of areas is modified minimally from other ones of the sensor devices.

11. The system of claim 1, wherein the sensor devices have an identical configuration.

12. The system of claim 1, wherein the sensor devices are configured as close-range sensors.

13. The system of claim 1, wherein the plurality of areas include at least one of a front area, a rear area, a side area, and a corner area.

14. The system of claim 13, wherein the side area is subdividable into a left-side area and a right-side area.

15. The system of claim 1, wherein up to six sensor devices are associated with an area of the plurality of areas.

16. The system of claim 1, wherein the at least one controller of each of the plurality of areas includes uniform software.

17. The system according to claim 16, wherein the uniform software includes parameterization for assigning a corresponding one of the at least one controller.

18. The system according to claim 1, wherein the parking function is performed.

19. The system according to claim 1, wherein the pre-crash function is performed.

20. The system according to claim 1, wherein the airbag function is performed.

* * * * *